US012762414B2

(12) United States Patent
Floratou et al.

(10) Patent No.: US 12,762,414 B2
(45) Date of Patent: Oct. 13, 2026

(54) LINGUISTIC SCHEMA MAPPING VIA SEMI-SUPERVISED LEARNING

(71) Applicant: Microsoft Technology Licensing, LLC, Redmond, WA (US)

(72) Inventors: Avrilia Floratou, Sunnyvale, CA (US); Joyce Yu Cahoon, Woodinville, WA (US); Subramaniam Venkatraman Krishnan, Santa Clara, CA (US); Andreas C. Mueller, Los Gatos, CA (US); Dalitso Hansini Banda, Mountain View, CA (US); Fotis Psallidas, Brooklyn, NY (US); Jignesh Patel, Madison, WI (US); Yunjia Zhang, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1147 days.

(21) Appl. No.: 17/827,688

(22) Filed: May 28, 2022

(65) Prior Publication Data

US 2023/0385649 A1 Nov. 30, 2023

(51) Int. Cl.

| | |
|---|---|
| ***G06N 3/088*** | (2023.01) |
| ***G06F 18/2113*** | (2023.01) |
| ***G06F 18/214*** | (2023.01) |
| ***G06F 18/22*** | (2023.01) |
| ***G06N 3/08*** | (2023.01) |
| ***G06N 3/091*** | (2023.01) |

(52) U.S. Cl.

CPC ......... *G06N 3/088* (2013.01); *G06F 18/2113* (2023.01); *G06F 18/214* (2023.01); *G06F 18/22* (2023.01); *G06N 3/08* (2013.01); *G06N 3/091* (2023.01)

(58) Field of Classification Search

CPC .......... G06N 3/088; G06N 3/08; G06N 3/091; G06F 18/22; G06F 18/2113; G06F 18/214

See application file for complete search history.

(56) References Cited

U.S. PATENT DOCUMENTS

| | | | | |
|---|---|---|---|---|
| 12,020,297 | B1 * | 6/2024 | Simhon .............. | G06Q 30/0641 |
| 2004/0260715 | A1 * | 12/2004 | Mongeon ................ | G06F 16/80 |
| 2006/0253476 | A1 | 11/2006 | Roth et al. | |

(Continued)

OTHER PUBLICATIONS

Berlin et al., "Database Schema Matching Using Machine Learning with Feature Selection," A. Banks Pidduck et al. (Eds.): CAISE 2002, LNCS 2348, pp. 452-466, 2002 (Year: 2002).*

(Continued)

*Primary Examiner* — Miranda M Huang
*Assistant Examiner* — Yao David Huang
(74) *Attorney, Agent, or Firm* — Workman Nydegger

(57) ABSTRACT

Linguistic schema mapping via semi-supervised learning is used to map a customer schema to a particular industry-specific schema (ISS). The customer schema is received and a corresponding ISS is identified. An attribute in the customer schema is selected for labeling. Candidate pairs are generated that include the first attribute and one or more second attributes which may describe the first attribute. A featurizer determines similarities between the first attribute and second attribute in each generated pair, one or more suggested labels are generated by a machine learning (ML) model, and one of the suggested labels is applied to the first attribute.

20 Claims, 6 Drawing Sheets

(56) References Cited

U.S. PATENT DOCUMENTS

| | | | | |
|---|---|---|---|---|
| 2007/0185868 | A1 | 8/2007 | Roth et al. | |
| 2012/0078913 | A1* | 3/2012 | Muni | G06F 16/211 707/769 |
| 2020/0134058 | A1* | 4/2020 | Liu | G06F 16/2379 |
| 2021/0073655 | A1 | 3/2021 | Portisch et al. | |
| 2022/0100714 | A1* | 3/2022 | Zhao | G06N 3/045 |
| 2023/0222511 | A1* | 7/2023 | Baghdasaryan | G06Q 30/016 706/12 |
| 2023/0244644 | A1* | 8/2023 | Kotecha | G06F 40/295 707/803 |
| 2023/0386612 | A1* | 11/2023 | Frings | G16H 50/70 |

OTHER PUBLICATIONS

Partyka et al., "Enhanced geographically typed semantic schema matching," Journal of Web Semantics vol. 9, Issue 1, Mar. 2011, pp. 52-70 (Year: 2011).*

Ten Cate et al., "Active Learning of GAV Shema Mappings," PODS'18, Jun. 10-15, 2018, Houston, TX, USA (Year: 2018).*

Zhao et al., "Importance-Weighted Label Prediction for Active Learning with Noisy Annotations," 21st International Conference on Pattern Recognition (ICPR 2012) Nov. 11-15, 2012. Tsukuba, Japan (Year: 2012).*

Meduri et al., "A Comprehensive Benchmark Framework for Active Learning Methods in Entity Matching," SIGMOD '20, Jun. 14-19, 2020, Portland, OR, USA (Year: 2020).*

"Ablation (artificial intelligence)", Retrieved from: https://en.wikipedia.org/wiki/Ablation_(artificial_intelligence), Apr. 11, 2022, 2 Pages.

"Amount of data created, consumed, and stored 2010-2025", Retrieved from: https://www.statista.com/statistics/871513/worldwide-data-created/, May 23, 2022, 2 Pages.

"Azure industry solutions", Retrieved from: https://web.archive.org/web/20220430114952/https://azure.microsoft.com/en-us/industries/, Apr. 30, 2022, 6 Pages.

"Lakehouse for Retail", Retrieved from: https://web.archive.org/web/20220523200731/https://databricks.com/solutions/industries/retail-industry-solutions, May 23, 2022, 14 Pages.

"SAP Industries", Retrieved from: https://web.archive.org/web/20220530033513/https://www.sap.com/industries.html, May 30, 2022, 5 Pages.

"Smart Manufacturing Market", Retrieved from: https://web.archive.org/web/20220309072736/https://www.marketsandmarkets.com/Market-Reports/smart-manufacturing-market-105448439.html, Mar. 9, 2022, 6 Pages.

"WordNet", Retrieved from: https://web.archive.org/web/20220530074009/https://wordnet.princeton.edu/, May 30, 2022, 4 Pages.

Bansal, et al., "Diverse Distributions of Self-Supervised Tasks for Meta-Learning in NLP", In Repository of arXiv:2111.01322v1, Nov. 2, 2021, 13 Pages.

Bernstein, et al., "Industrial-strength schema matching", In Journal of ACM Sigmod Record, vol. 33, Issue 4, Dec. 2004, pp. 38-43.

Bishop, Christopher M. , "Neural Networks for Pattern Recognition", In Publication of Oxford Press, Nov. 1995, 499 Pages.

Bonta, Rob, "California Consumer Privacy Act", Retrieved from: https://web.archive.org/web/20220531091403/ https://oag.ca.gov/privacy/ccpa, May 31, 2022, 8 Pages.

Cappuzzo, et al., "Creating Embeddings of Heterogeneous Relational Datasets for Data Integration Tasks", In Proceedings of the ACM SIGMOD International Conference on Management of Data, Jun. 14, 2020, pp. 1335-1349.

Chen, Peter Pin-Shan, "The Entity-Relationship Model-Toward a Unified View of Data", In Journal of ACM transactions on database systems, vol. 1, Issue 1, Mar. 1, 1976, pp. 9-36.

Devlin, et al., "Bert: Pre-training of deep bidirectional transformers for language understanding", In Repository of arXiv:1810.04805v2, May 24, 2019, 16 Pages.

Devlin, et al., "BERT: Pre-training of Deep Bidirectional Transformers for Language Understanding", In Repository of arXiv:1810.04805v1, Oct. 11, 2018, 14 Pages.

Dhamankar, et al., "iMAP: Discovering Complex Semantic Matches Between Database Schemas", In Proceedings of the ACM SIGMOD International Conference on Management of Data, Jun. 13, 2004, 12 Pages.

Do, et al., "COMA—A system for flexible combination of schema matching approaches", In Proceedings of the 28th International Conference on Very Large Databases, Aug. 2002, 12 Pages.

Doan, et al., "Learning Source Description for Data Integration", In WebDB (Informal Proceedings), May 18, 2000, 6 Pages.

Doan, et al., "Learning to Map between Ontologies on the Semantic Web", In Proceedings of the 11th International Conference on World Wide Web, May 7, 2002, pp. 662-673.

Doan, et al., "Principles of Data Integration", In Publication of Morgan Kaufmann, Chapter 5, 75 pages, 2012.

Drumm, et al., "Quickmig: automatic schema matching for data migration projects", In Proceedings of the sixteenth ACM conference on Conference on information and knowledge management, Nov. 6, 2007, pp. 107-116.

Du, et al., "Self-training improves pre-training for natural language understanding", In Repository of arXiv:2010.02194v1, Oct. 5, 2020, 11 Pages.

Fernandez, et al., "Seeping semantics: Linking datasets using word embeddings for data discovery", In Proceedings of IEEE 34th International Conference on Data Engineering, Apr. 16, 2018, pp. 989-1000.

Giunchiglia, et al., "S-Match: an Algorithm and an Implementation of Semantic Matching", In Proceedings of the European Semantic Web Symposium, Feb. 2004, 17 Pages.

Halevy, et al., "Data integration: the teenage years", In Proceedings of the 32nd international conference on Very large data bases, Sep. 12, 2006, pp. 9-16.

Hernandez, et al., "Clio: A Semi-Automatic Tool For Schema Mapping", In Journal of ACM Sigmod Record, vol. 30, Issue 2, May 21, 2001, 1 Page.

Joulin, et al., "FastText.zip: Compressing text classification models", In Repository of arXiv:1612.03651v1, Dec. 12, 2016, pp. 1-13.

Koutras, et al., "REMA: Graph Embeddings-based Relational Schema Matching", In the EDBT/ICDT Workshop, Mar. 30, 2020, 4 Pages.

Li, et al., "Deep entity matching with pre-trained language models", In Repository of arXiv:2004.00584v1, Apr. 1, 2020, 10 Pages.

Li, et al., "SEMINT: A tool for identifying attribute correspondences in heterogeneous databases using neural networks", In Journal of Data & Knowledge Engineering, vol. 33, Issue 1, Apr. 2000, pp. 49-84.

Liu, et al., "Pre-train, prompt, and predict: A systematic survey of prompting methods in natural language processing", In Repository of arXiv:2107.13586v1, Jul. 28, 2021, pp. 1-46.

Luján-Mora, et al., "Data Mapping Diagrams for Data Warehouse Design with UML", In International Conference on Conceptual Modeling, Nov. 8, 2004, pp. 191-204.

Madhavan, et al., "Generic Schema Matching with Cupid", In Proceedings of the International Conference on Very Large Data Bases, Jan. 1, 2001, pp. 1-10.

Mccann, et al., "Building data integration systems via mass collaboration", In International Workshop on the Web and Databases, Jun. 12, 2003, pp. 25-30.

Min, et al., "Metaicl: Learning to learn in context", In Repository of arXiv:2110.15943v2, May 3, 2022, 19 Pages.

Palopoli, et al., "The system DIKE: towards the semiautomatic synthesis of cooperative information systems and data warehouses", In ADBIS-DASFAA Symposium, Sep. 5, 2000, 11 Pages.

Rahm, et al., "A survey of approaches to automatic schema matching", In the Very Large Data Bases Journal, vol. 10 Issue 4, Dec. 2001, pp. 334-350.

Rahm, Erhard, "Towards Large-Scale Schema and Ontology Matching", In Schema matching and mapping, Jan. 2011, pp. 3-27.

Röttger, et al., "Temporal Adaptation of BERT and Performance on Downstream Document Classification: Insights from Social Media", In Repository of arXiv:2104.08116v2, Sep. 8, 2021, 13 Pages.

(56) References Cited

OTHER PUBLICATIONS

Schick, et al., "Exploiting cloze questions for few shot text classification and natural language inference", In Repository of arXiv:2001.07676v3, Jan. 25, 2021, 15 Pages.
Settles, Burr, "Active Learning Literature Survey", In Technical Report 1648 of Computer Sciences, University of Wisconsin-Madison, Jan. 2009, 47 Pages.
"Regulation (EU) 2016/679 of the European Parliament", Retrieved from: https://eur-lex.europa.eu/legal-content/EN/ALL/?uri=celex%3A32016R0679, Apr. 27, 2016, 95 Pages.
"International Search Report and Written Opinion Issued in PCT Application No. PCT/US23/018246", Mailing Date: Aug. 7, 2023, 11 Pages.

* cited by examiner

LINGUISTIC SCHEMA MAPPING VIA SEMI-SUPERVISED LEARNING

BACKGROUND

Various industries implement data-driven approaches in order to discover powerful insights and identify future strategic opportunities. In particular, the growth of emerging markets may be attributed to an increasing emphasis on real-time data analysis and predictive maintenance. At the same time, more information is collected now than ever before, highlighting a need for modern data analytics tools that keep up with the volume, variety, and velocity of data associated with different industries. Accordingly, industry-specific analytics solutions are becoming more and more prevalent in order to meet customers' domain-specific needs. New tools and services are increasingly implemented in order to optimize industry-specific processes, provide enhanced collaboration capabilities, and reduce the time required to generate actionable insights require a detailed understanding of the customer data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that perform linguistic schema mapping via semi-supervised learning. The method includes receiving a customer schema, identifying an industry-specific schema corresponding to the received customer schema, selecting a first attribute included within the received customer schema for labeling, generating at least one candidate pair based on the selected one or more attributes, the candidate pair including the first attribute and a second attribute; generating at least one featurized candidate based on an identified linguistic similarity, determined by a linguistic featurizer, between the first attribute and the second attribute; generating one or more suggested labels for the first attribute, the one or more suggested labels corresponding to the second attribute, and applying the one of the suggested labels to the first attribute.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
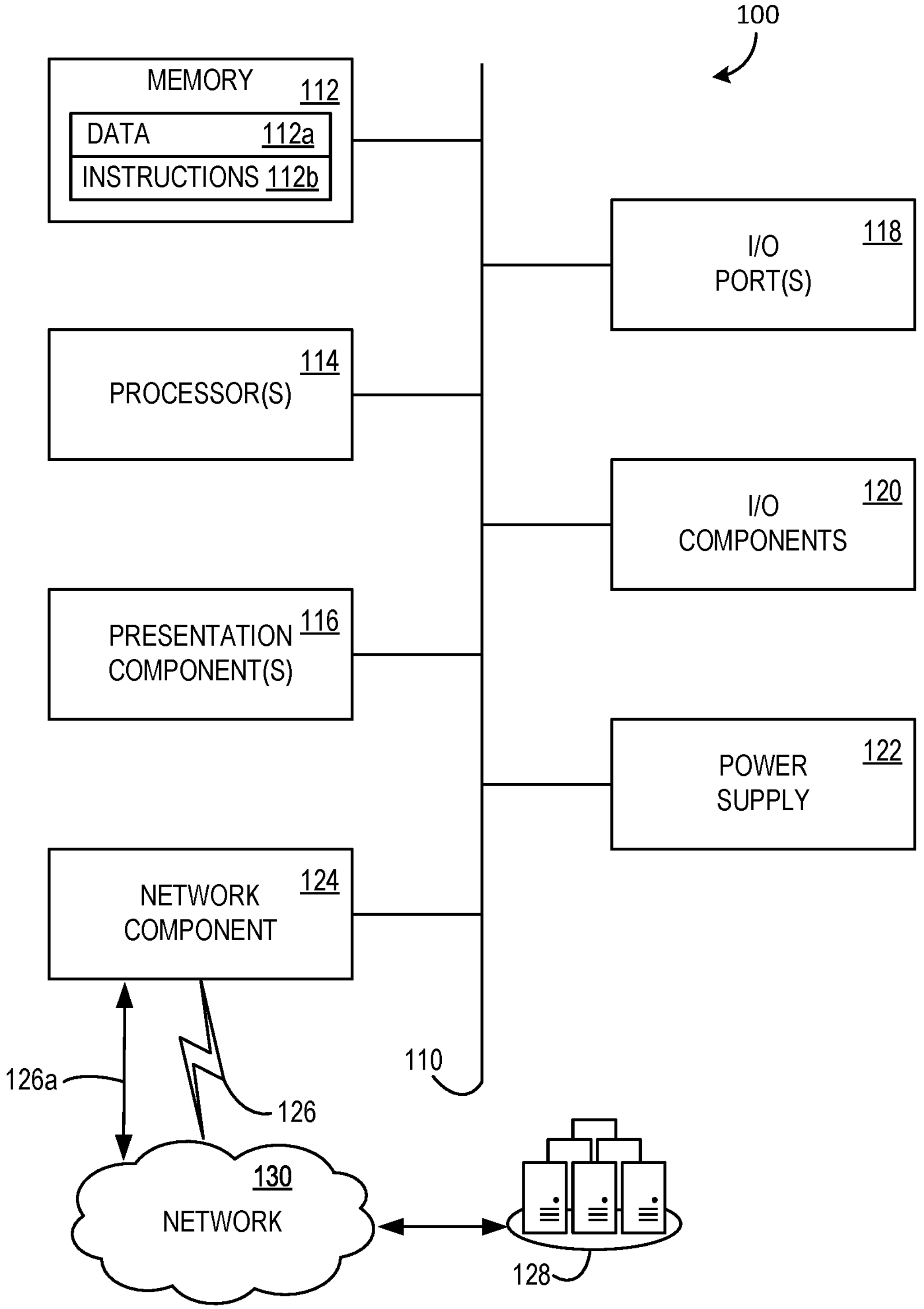
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, industry-specific analytics solutions may include mapping customer data to an industry-specific schema (ISS) and then using the ISS to build one or more tools that streamline various processes and reduce the time-to-value. However, mapping data to an ISS presents several challenges. Customers face a significant learning curve due to the time and resources required to understand concepts included in the ISS and map them to the customer data by relating them to one or more schema in the customer data, writing scripts, implementing transformative pipelines to bring customer data to a new format, and validating the transformation process. This requires significant time and is error-prone due to the manual nature of the process, resulting in potential bottlenecks when on-boarding a new customer.

Current solutions present several flaws. While schemas associated with the customer data may be accessible, due to privacy constraints the specific customer data and/or instances is often limited. In addition, an ISS typically includes a large number of entities and attributes in order to capture a wide variety of concepts associated with a particular industry. However, customer schemas may not encapsulate each of these concepts and are often smaller than the target ISS, which may complicate the process of schema mapping because the mapping results in a large number of available candidate matches for each attribute, many of which are irrelevant in practice. Further, the customer schema may include entity and attribute names that are difficult to understand, due to abbreviations and/or customer-specific terminology, which leads to additional challenges in automating the schema mapping process. For example, similarity metrics may fail to capture matches where the entity and attribute names between source and target schemas are different but semantically equivalent, particularly where the multi-word names in both entities and attributes are present.

Accordingly, the present disclosure provides systems and methods of a linguistic schema mapping approach based on supervised or semi-supervised and active learning that accesses the customer schema without accessing the individual data instances contained within the customer schema. The linguistic schema mapping approach includes a language model that provides improved noise handling in the customer schema, resulting in higher overall accuracy. Based on received feedback on predicted mapping suggestions generated by the language model, the language model is iteratively retrained in order to more and more accurately rank candidate matches, which enables scaling to larger ISSs.

The current solutions further fail to provide an ISS that is both scalable and robust enough to address each of these challenges. A smaller-scale ISS provides a search space too small to effectively map the target and source attributes, while a larger-scale ISS traditionally provide a search space that is too large and returns irrelevant candidates. Accordingly, the present disclosure implements a least confidence anchor (LCA) strategy to identify the most relevant target candidates for each source attribute in order to narrow the potential pool of target candidates from a large, robust ISS.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112*a* and instructions 112*b* that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126*a* across network 130 to a cloud environment 128. Various different examples of communication links 126 and 126*a* include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more servers. The computing device 100 may be implemented as a system 200 or a system 500 as described in greater detail below.

Figure 2:
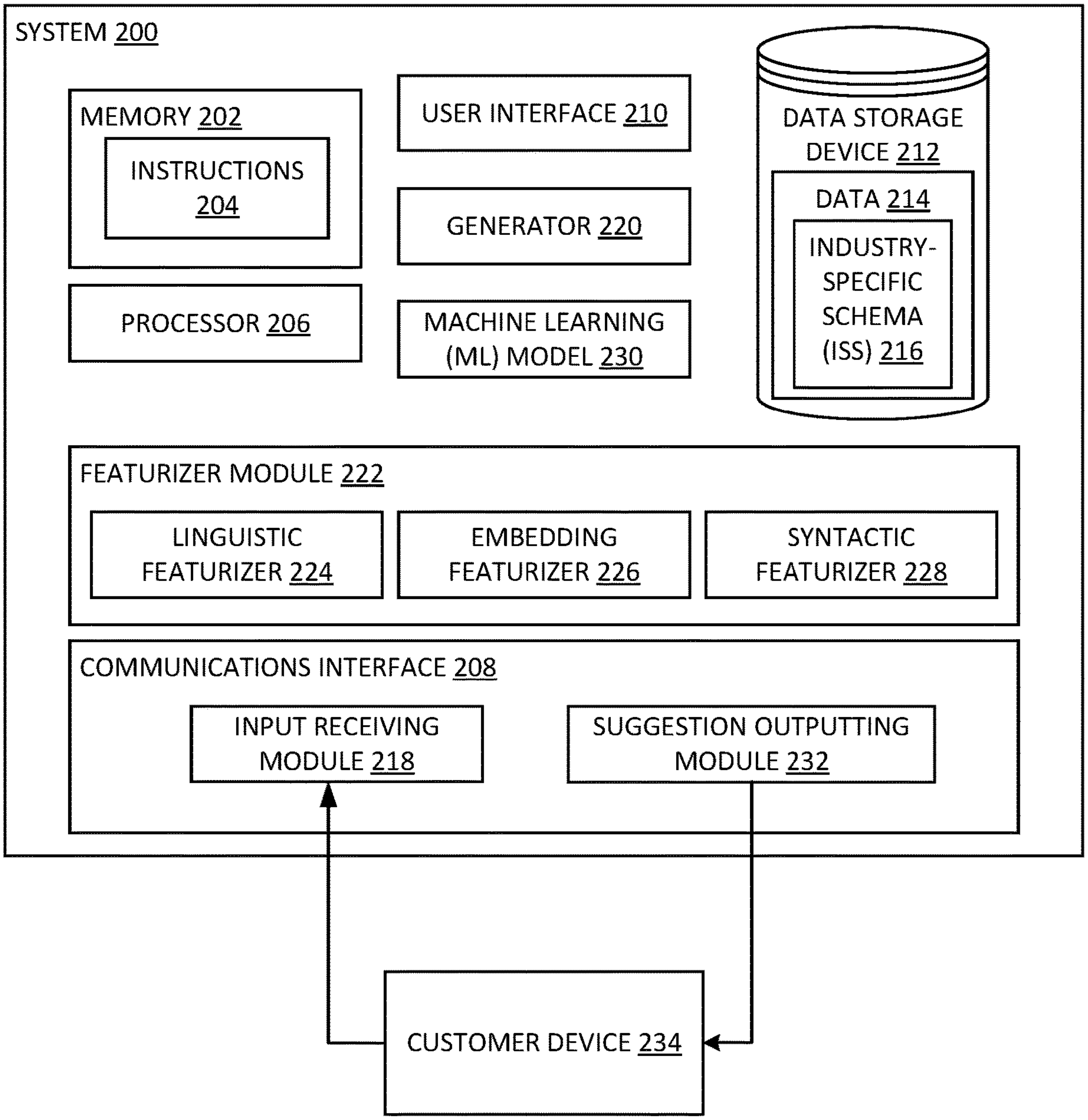
FIG. 2 is a block diagram illustrating an example computing device for implementing various examples of the present disclosure.

FIG. 2 is a block diagram illustrating an example computing device for implementing various examples of the present disclosure. The system 200 may include the computing device 100. In some implementations, the system 200 includes a cloud-implemented server that includes each of the components of the system 200 described herein. In some implementations, the system 200 is presented as a single computing device that contains each of the components of the system 200.

The system 200 includes a memory 202, a processor 206, a communications interface 208, a user interface 210, a data storage device 212, an input receiving module 218, a generator 220, a featurizer module 222, a machine learning (ML) model 230, and a suggestion outputting module 232. The memory 202 stores instructions 204 executed by the processor 206 to control the communications interface 208, the user interface 210, the input receiving module 218, the generator 220, featurizer module 222, the machine learning (ML) model 230, and the suggestion outputting module 232. In some implementations, the input receiving module 218 and the suggestion outputting module 232 are implemented on the communications interface 208.

The processor 206 executes the instructions 204 stored on the memory 202 to execute various functions of the system 200. For example, the processor 206 controls the communications interface 208 to transmit and receive various signals and data, controls the data storage device 212 to store data 214, controls the user interface 210 to display content, controls the input receiving module 218 to receive one or more inputs from a customer device 234, controls the generator 220 to generate candidate pairs for analysis and labeling, controls the featurizer module 222 generate one or more featured candidates, controls the machine learning (ML) model 230 to execute one or more ML processes on the generated featured candidates to generate matching, or mapping, suggestions for the labels of the featured candidates, and controls the suggestion outputting module 232 to output the matching suggestions to the customer device 234.

The data storage device 212 stores data 214, including one or more industry-specific schema (ISS) 216. In some implementations, the ISS 216 is an industry-defined schema for data organization and data storage. Accordingly, the ISS 216 stored in the data storage device 212 may include different versions corresponding to different industries served by the system 200, including but not limited to the retail industry, manufacturing industry, hospitality industry, healthcare industry, and so forth. For example, the retail industry may implement a particular ISS 216 different than an ISS 216 implemented by the healthcare industry, each of which are different than an ISS 216 implemented by the manufacturing industry. In one particular example, an ISS 216 defined for the retail industry may include information, including entities and attributes, about customers, goods, stores, promotions, sales, and other assets that are typically tracked. For example, a particular retail-defined ISS 216 may include 92 entities, 1218 attributes, and 184 PK/FK relationships. The received customer schema is smaller than the ISS 216 because a customer is unlikely to include each entity, attribute, and PK/FK relationship of the ISS 216.

Thus, a particular ISS 216 described herein may be specific to the data received from the customer device 234 and/or the industry associated with the customer device 234. For example, the ISS 216 may be a target ISS schema $S_t$ that includes a set of entities $E_t$, a set of attributes $A_t$, and a set of primary key (PK)/foreign key (FK) relationships $R_t$. The target ISS schema $S_t$ may correspond to one or more customer schemas $S_s$ received by the input receiving module 218.

In some implementations, each ISS 216 may contain a much larger number of entities and attributes than a received customer schema because the ISS 216 is intended to capture almost every conceivable concept within a particular industry, whereas the customer schema will be specific to a particular customer and some entities and/or attributes may not be needed or used by the particular customer. As a result, the search space for mapping the customer schema to the ISS 216 becomes larger, resulting in a greater number of candidate target attributes for each source attribute. However, the existence of a large number of attributes in the target schema along with multi-word attribute names also increases the chances that such candidates will occur. The present disclosure recognizes these challenges and provides a linguistic schema mapping approach based on semi-supervised and active learning that uses a linguistic featurizer 224, described in greater below, to generate improved similarity scores for yet unmapped attributes in the customer schema.

The input receiving module 218 is implemented by the processor 206 and receives one or more inputs from the customer device 234. For example, the input receiving module 218 may receive a first input including a source schema, such as a customer schema $S_s$, to be analyzed and processed as described herein, and a second input selecting one or more labels following the output of suggested labels by the suggestion output module 232 to the customer device 234.

The customer schema $S_s$ may include a set of entities $E_s$, a set of attributes $A_s$, and a set of PK/FK relationships $R_s$. Accordingly, one or more of the attributes, entities, and PK/FK relationships are present in each of the customer schema $S_s$ and the target ISS schema $S_t$. Some examples of the present disclosure assume that each attribute in $A_s(A_t)$ belongs to a single entity in $E_s(E_t)$. Each entity e (e∈EsUEt) may include a name e.name, a primary key e.pk, and a set of foreign keys e.fks. Each attribute a (a∈AsUAt) may include a name a.name, a data type a.dtype, and optionally an associated natural language description a.desc.

An attribute correspondence may be defined as $r_{ij}=(a_i,a_j)$, where $a_i$ is an attribute in the source schema $S_s$ and $a_j$ is an attribute in the target schema $S_t$, such as the ISS 216. In some examples, $a_i$ is referred to herein as and $a_j$ is referred to herein as $a_t$. An attribute correspondence specifies a relationship between $a_s$ and $a_t$. The correspondence may specify that the two attributes are equal to each other or that a transformation may be involved. For example, a transformation may include a conversion between different forms of currency, such as USD to euros, and so forth. In some examples, the correspondence may denote equality, indicating that $a_s$ is equal to or analogous to $a_t$.

Figure 3:
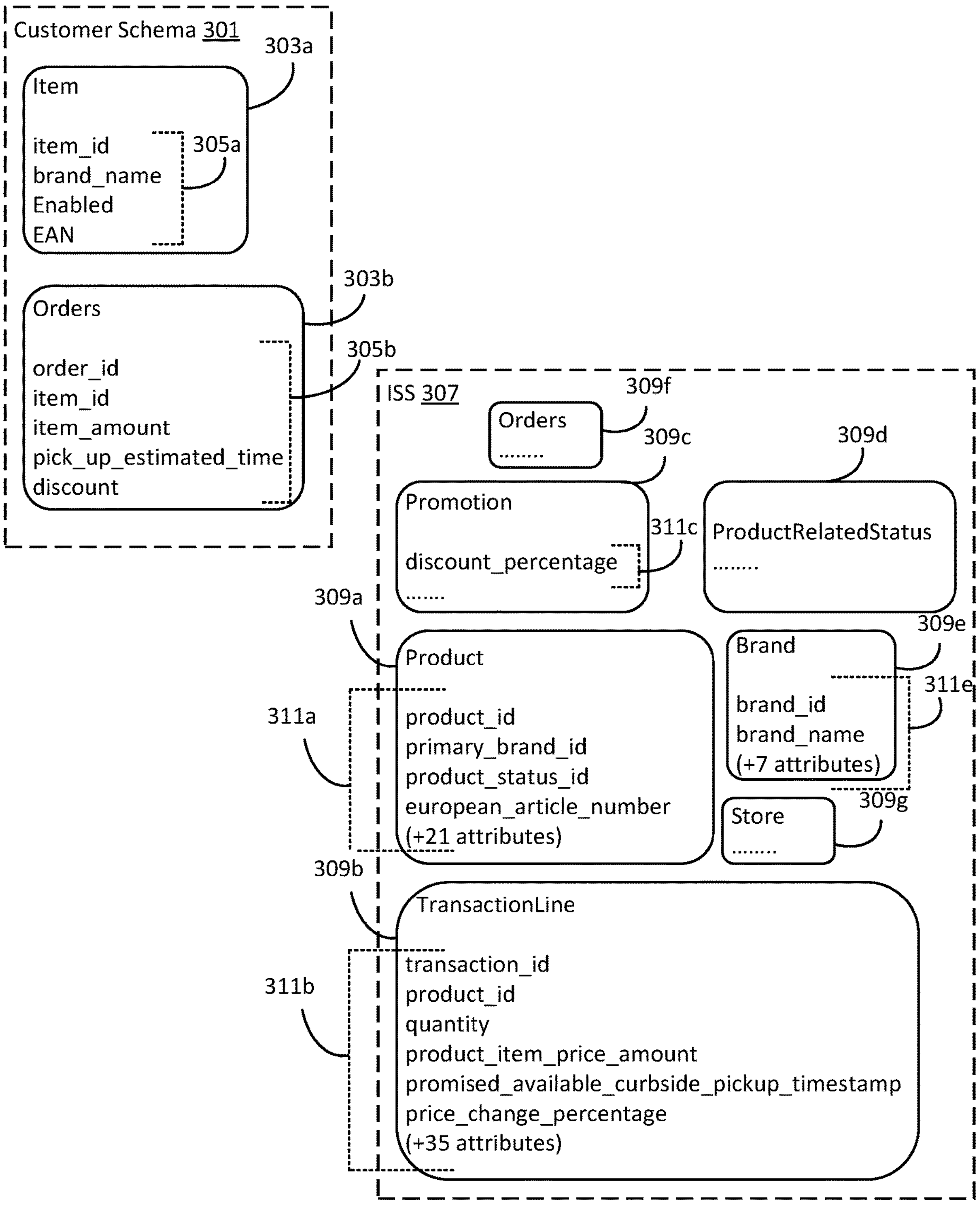
FIG. 3 illustrates an example customer schema and a corresponding industry-specific schema (ISS) according to various examples of the present disclosure.

For example, FIG. 3 illustrates an example customer schema and a corresponding industry-specific schema (ISS) according to various examples of the present disclosure. It should be understood that the examples of the customer schema 301 and the ISS 307 are presented for illustration only and should not be construed as limiting. Various examples of the customer schema 301 and the ISS 307 may be used without departing from the scope of the present disclosure.

FIG. 3 illustrates a customer schema 301 and an ISS 307. The customer schema 301 may be one example of the customer schema $S_s$ described herein that is received by the input receiving module 218 from the customer device 234. The ISS 307 may be one example of the ISS $S_t$ 216 stored in the data storage device 212 as data 214.

The particular ISS 307 retrieved from the data storage device 212 depends on the particular customer schema 301 that is received. For example, the customer schema 301 includes an entity 303*a* that is an item with attributes 305*a* such as brand_id, brand_name, enabled, and European article number (EAN) and an entity 303*b* that is an order with attributes 305*b* such as order_id, item_id, item_amount, pick_up_estimated_time, and discount. Based on the attributes identified in the customer schema 301, the processor 206 retrieves an ISS 307 that includes similar entities and attributes. The ISS 307 includes an entity 309*a* that is a product with attributes 311*a*, an entity 309*b* that is a TransactionLine with attributes 311*b*, an entity 309*c* that is a promotion with attributes 311*c*, an entity 309*d* that is a ProductRelatedStatus, an entity 309*e* that is a brand with attributes 311*e*, an entity 309*f* that is orders, and an entity 309*g* that is a store. The product entity in the ISS 307 maps to the item entity in the customer schema 301. More particularly, the product_id maps to the item_id, the product_status_id maps to enabled, and the european_article_number maps to the EAN. As another example, the TransactionLine entity in the ISS 307 maps to the orders entity in the customer schema 301, and the transaction_id maps to the order_id, the product_id maps to the item_d, quantity maps to the item_amount, promised_available_curbside_pickup_timestamp maps to pick_up_estimated_time, and price_change_percentage maps to discount. Accordingly, because the retail-specific ISS 216 captures a wide variety of retail-related concepts, each of the source attributes $a_i \in A_s$ 305 in the customer schema 301 has a matching attribute 309 in the target ISS 215 $a_t$. For each source attribute 305, a list of mapping suggestions may be provided and the top-k accuracy of these suggestions may be measured on the unlabeled part of the customer schema 301. In some implementations, k=3, although other implementations are possible.

In addition, each of the customer schema 301 and the ISS 307 include one or more PK/FK relationships. The PK/FK relationships define the attribute reference relationship between entities. More particularly, the primary keys and foreign keys may be used as mapping anchors in the active learning phase of the semi-supervised learning model. For example, in the customer schema 301, a PK/FK relationship exists between the item_id in the item entity and item_id in the order entity. In the ISS 307, a PK/FK relationship exists between the brand_id in the brand entity and the primary_brand_id in the product entity, and between the product_id in the product entity and the product_id in the TransactionLine entity.

The generator 220 is implemented on the processor 206 and generates one or more sets of candidate pairs, such as the candidate pairs 509 described with reference to FIG. 5. Using the received customer schema $S_s$, such as the customer schema 301, and the retrieved ISS 216, the generator 220 generates a set of candidate pairs by calculating a Cartesian product between two sets of attributes $A_s$ and $A_t$ from the customer schema 301 and the ISS 326, respectively. For example, the generator 220 generates a set of candidate pairs P by calculating $P=A_s \times A_t=\{(a_s,a_t) | as \in A_s, a_t \in A_t\}$. Each candidate pair p∈P, has an associated label $l_p$ to eventually be assigned automatically or by a user, indicating whether the candidate pair represents a correct mapping, an incorrect mapping, or is currently unlabeled. Where the candidate pair represents a correct mapping, the label $l_p$ is later assigned $l_p=1$, where the candidate pair represents an incorrect mapping, the label $l_p$ is later assigned $l_p=0$, and where the candidate pair is currently unlabeled the label $l_p$ is assigned $l_p=-1$. After the generator 220 has generated the set of candidate pairs, each label $l_p$ is initially labeled as $l_p=-1$. In some implementations, the generated candidate pairs are anchor points. In other implementations, the generated candidate pairs are selected as part of a random selection strategy.

The featurizer module 222 is implemented on the processor 206 and converts the candidate pairs generated by the generator 220 into numerical vectors. Each individual featurizer takes the two attributes in the generated candidate pair as an input and outputs a candidate score. For example, the candidate pairs $(a_s,a_t)\in P$ are converted into numerical vectors that represent the score. The featurizer module 222 is a modular featurization pipeline that includes one or more featurizers including, but not limited to, the linguistic featurizer 224, the embedding featurizer 226, the syntactic featurizer 228 to measure the similarity between the attributes $a_s$ and $a_t$ using various metrics. However, other examples are possible and additional featurizers can be included in the pipeline, some featurizers can be removed, and so forth. The linguistic featurizer 224 takes the matching, generated candidate pairs as input and outputs the similarity between the candidate pairs in terms of linguistic similarity. In some examples, the linguistic featurizer 224 is updated at each loop through the system 200. The embedding featurizer 226 calculates and outputs the embedded word similarity of the candidate pairs. For example, the embedding featurizer 226 calculates the cosine similarity between the embedding representations of the attribute name. The syntactic featurizer 228 measures whether two attributes are syntactically similar and outputs the syntactic similarity of the generated candidate pairs. For example, for an attribute pair $(a_s, a_t)$, the similarity score may be calculated as $$\frac{lsc\,(\text{as.name.at.name})}{\min(\text{len(as.name), len(at, name)})},$$

where lcs computes the length of the longest common sub-string. By combining multiple types of featurizers within the featurizer module 222, the featurizer module 222 provides improved accuracy, particularly in scenarios where the customer schema uses different naming conventions that the ISS 216 and/or where a limited number of labels, or no labels, are initially provided.

In some implementations, the linguistic featurizer 224 is a pretrained bidirectional encoder representations from transformers (BERT) model that includes a fine-tuning neural layer, such as the machine learning (ML) model 230, appended to process outputs from the BERT model. The BERT mode, or featurizer, is a linguistic model for natural language processing (NLP) that receives a sentence input that includes a name and description, concatenates the name and description, and generates an output of a prediction of a next sentence. In some examples, the BERT featurizer addresses challenges associated with current linguistic schema mapping that provide low accuracy on real customer datasets due to a lack of robust response to noise in the entity and attribute names in the source schema. The noise may be in the form of customer-specific terminology or abbreviations, such as item.EAN in the item entity in the customer schema 301, or mislabeled attributes. In addition, the ISS 216 includes a large number of entities and attributes with multi-word names, such as TransactionLine.product_item_price_amount, that may further complicate the matching, or mapping, process. The BERT featurizer addresses these challenges as a binary text classification problem by predicting whether two attributes in a given sentence represent a correct mapping by leveraging NLP tasks such as text generation, text classification, summary extraction, entity matching, and so forth to capture similarities between the attributes in each candidate pair using the corresponding names and descriptions.

Figure 4:
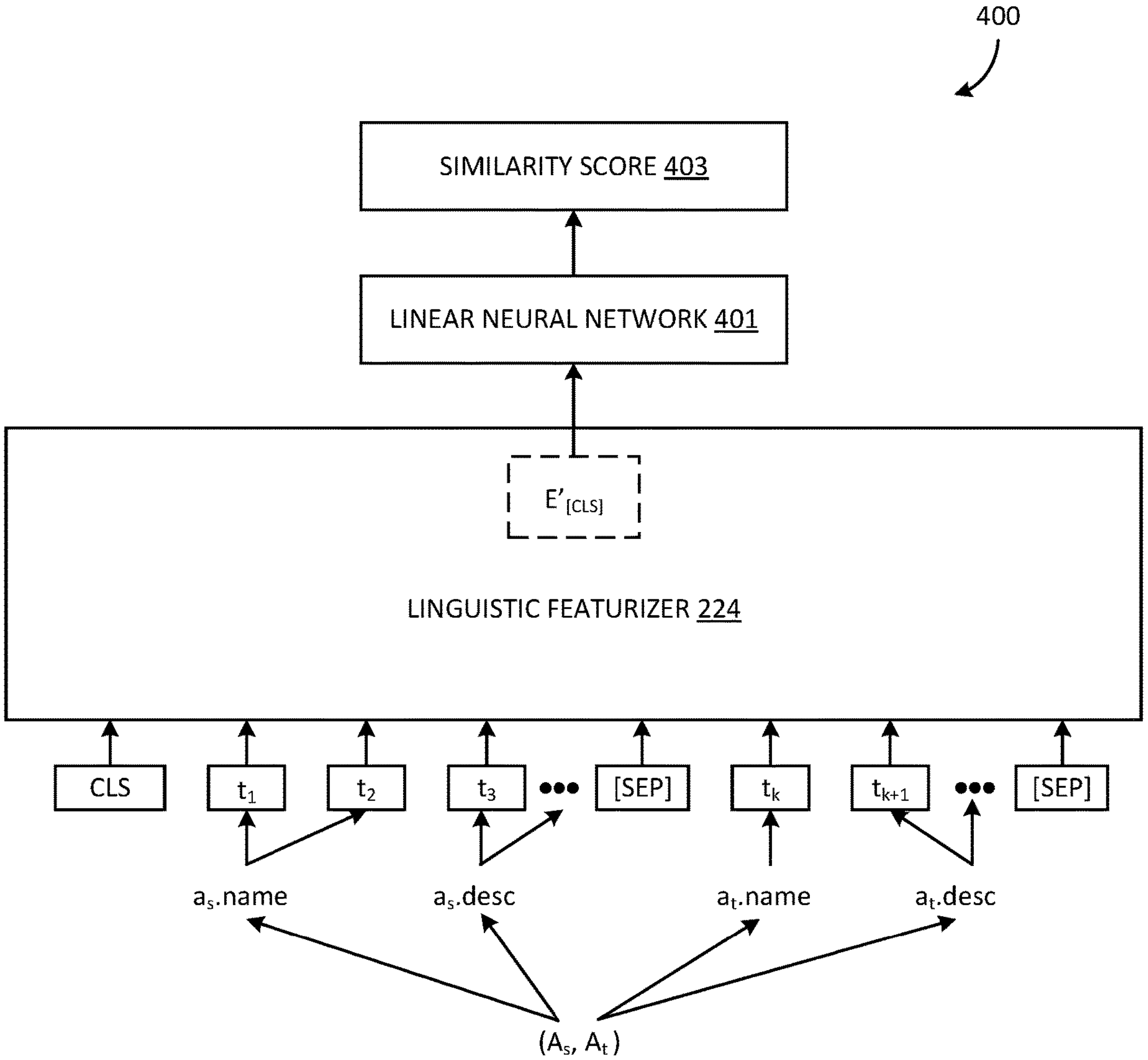
FIG. 4 is a system diagram illustrating an architecture of a linguistic featurizer according to various examples of the present disclosure.

The linguistic featurizer 224 includes a model architecture as illustrated in FIG. 4. However, it should be understood that the examples of the linguistic featurizer 224 are presented for illustration only and should not be construed as limiting. Various examples of the linguistic featurizer 224 may be used without departing from the scope of the present disclosure.

In some implementations, the language model of the linguistic featurizer 224 is pretrained on large, publicly available natural language corpus and the weights in the pretrained language model are frozen in the linguistic featurizer. As shown in FIG. 4, the linguistic featurizer 224 receives an input of generated pairs $(A_s, A_t)$, for example as generated by the generator 220, that is decomposed into a sentence input. The sentence input includes a name and description for each of the generated pairs corresponding to the customer schema 301 and the ISS 216. For example, the generated pair $(A_s, A_t)$ is decomposed into $a_s$.name and $a_s$.desc for the customer schema $A_s$, i.e., a name and description for the customer schema $A_s$, and $a_t$.name and $a_t$.desc for the ISS 216. The name and description for each of the customer schema $A_s$ and the ISS $A_t$ 216 are concatenated into a sentence. For example, for each candidate pair $(a_s,a_t)$, the input sentence to the model is generated as [CLS] $a_s$.name $a_s$.desc [SEP] $a_t$.name $a_t$.desc [SEP]. [CLS] is a specialized, BERT token that marks the beginning of the input sequence and includes condensed information regarding the sentence or sentences and [SEP] is a specialized, BERT token that marks a separation of the input sequence.

The linguistic featurizer 224 receives the input sentence and generates $E'_{[CLS]}$, a vector that represents the basic information of all of the inputs received. In some implementations, $E'_{[CLS]}$ is a 768 dimension vector, but other examples are possible. $E'_{[CLS]}$ is passed through a linear neural network 401, which outputs a similarity score 403 for the generated pair $(A_s, A_t)$. In some examples, the linear neural network 401 may be a single hidden layer neural network with a sigmoid activation function. In some examples, the linear neural network 401 is a binary classifier that identifies the generated pair as similar or not similar, such as by outputting the similarity score 403 as a 0 or a 1. In other implementations, the linear neural network 401 outputs the similarity score 403 with a number between 0 and 1 to identify how similar the generated pair is. Accordingly, the output of the linguistic featurizer 224 is the similarity score 403 that measures how similar the values of the generated pair are.

In some implementations, the linguistic featurizer 224 is pre-trained, by leveraging the content of the ISS 216, to optimize performance. For example, the linguistic featurizer 224 may be trained one time per ISS 216, i.e., per vertical, resulting in a classifier that may be implemented for feature extraction on any received customer schema without additional training. To pre-train the linguistic featurizer 224, labeled input sequences are generated. Labeled input sequences may include positive samples or negative samples. Positive samples include self-repeating, self-explaining, and PK/FK linking. A self-repeating sentence is one where, for each attribute $a_t\in S_t$, a sentence [CLS] $a_s$.name $a_s$.desc [SEP] $a_t$.name $a_t$.desc [SEP] is generated with a positive label. A self-explaining sentence is one where, for each attribute $a_t\in S_t$, a sentence [CLS] $a_t$.name

[SEP] $a_t$.desc [SEP] is generated with a positive label. A PK/FK linking sentence is one where, for every two attributes $a_t$, $a_k \in S_t$ with a PK/FK relationship, a sentence [CLS] $a_s$.name $a_s$.desc [SEP] $a_k$.name $a_k$.desc [SEP] is generated with a positive label. A negative sample is a sample where one side of the positively labeled sentence is randomly corrupted. For example, $a'_t \in S_t$, $a'_t \neq a_t$ is randomly chosen and at is replaced with $a'_t$ for all the three types of positive samples. A negative sample is used to indicate an incorrect mapping to the linguistic featurizer 224, which improves the accuracy of the linguistic featurizer 224. Accordingly, by pre-training the linguistic featurizer 224, the linguistic featurizer 224 is optimized for the downstream task of schema mapping even when no manual, or human, labels are initially provided.

In some implementations, the linguistic featurizer 224 is updated based on labels received from a user or an external device, such as the customer device 234, in each iteration. For example, for all attribute pairs $p=(a_s=a_t)$, $p \in P$ with labels $l_p$, the sentence [CLS] $a_s$.name $a_s$.desc [SEP] $a_t$.name $a_t$.desc [SEP] and the corresponding labels $l_p$ are added to the training set and assigned a larger sample weight than the samples generated using just the ISS 216. Accordingly, by updating the linguistic featurizer 224 based on user-provided labels, the linguistic featurizer 224 is optimized to more readily adapt to characteristics of each individual source schema, such as the received customer schema 301.

The ML model 230 is implemented on the processor 206 and includes a semi-supervised training framework. The ML model 230 is trained on the labeled subset of the training data and then used to generate labels, or pseudo-labels, for the unlabeled data points, i.e., the generated pairs. The ML model 230 receives feedback on the generated labels, which are then used to further train the ML model 230. Accordingly, the train-predict-train-predict-etc. loop is continued until all the generated pairs are labeled and no new labels are to be generated, or until the maximum allowed number of iterations is reached. For example, a maximum number of allowed iterations may be in place due to time constraints so that at least a subset of results are generated within an allotted time.

In some examples, the semi-supervised framework of the ML model 230 includes a linear classifier using logistic loss. The inputs of the classifier include the similarity scores generated by each featurizer included in the featurizer module 222 and the output labels are provided using the self-training procedure described herein. Following training of the ML model 230, the ML model 230 is used to make a prediction on each candidate pair $(a_s, a_t)$ in P and obtain a list of mapping scores. The mapping scores are further improved based on schema-level information including handling data type mismatches and penalizing introduction of new entities. Data type mismatches may occur where the source and target attributes do not have the same data type, indicating the label is not correct. Accordingly, the score is of a pair including attributes with different data types is set to zero. In other words, score $(a_s, a_t) \leftarrow 0$ where $a_s$.dtype$\neq a_t$.dtype.

In some implementations, the introduction of new entities may be penalized when mapping result in source attributes being mapped across multiple target entities in the ISS 216 in order to encourage a received customer schema being mapped to a concise subset of the ISS 216. Accordingly, the ML model 230 may introduce a heuristic model that applies a penalization $z \in [0,1]$ to penalize the mapping score, i.e., score $(a_s, a_t)) \leftarrow z$ X score $(a_s, a_t)$, where the entity that contains at is, thus far, not part of the current mapping. Thus, the closer the newly added entity is to the current entities in the ISS 216, the lower the cost of adding the new entity in to the mapping in terms of the number of join operations to be performed in case the data is later merged. The penalization term is therefore set as $$z = \frac{1}{1 + \log(1 + sp(\text{at}.M)))},$$

where $sp(a_t,M)$ denotes the shortest path between the entity containing $a_t$ and the entity, or entities, in the ISS 216 that are already included in the mapping M. Accordingly, for each attribute $a_s$ belonging to a candidate pair $(a_s, a_t) \in P$, the ML model 230 provides a list of mapping suggestions $k_s$ by selecting and outputting the target attributes $a_t$ that have the top-k predicted matching scores. For example, the list of k-attributes $(k_s)$ may be sorted indicating the top-k mapping suggestions. The prediction confidence $c_s$ of the mapping suggestions $k_s$ for $a_s$ is defined as the maximum score of all the candidate pairs $(a_s, a_t)$. In other words, $c_s=\max_{at \in ks}$ score$(a_s, a_t)$.

The suggestion outputting module 232 is implemented on the processor 206 and outputs the suggested labels, generated by the ML model 230, for the unlabeled source attributes $a_s$ to the customer device 234. In some alternative implementations, the processor 206 automatically labels the source attributes $a_s$ with the suggested labels. The highest value of $k_s$ may be automatically used to positively set the label for the attribute $a_t$ in the pair $(a_s, a_t)$. In other implementations, the input receiving module 218 receives a signal from the customer device 234 indicating whether to continue the interaction loop. In some examples, the input receiving module 218 may receive a signal indicating to continue the loop along with indications of correct labels and new labels for the set of attributes selected by the linguistic featurizer 224, or a signal indicating to not continue the loop. In other examples, the input receiving module 218 may not receive a signal from the customer device 234 for some time. Where a signal is received to continue the loop, the signal includes a selection of the correct attribute that $a_s$ maps to, or an indication there are no correct mappings in the k mapping suggestions. Where the correct mapping attribute $a_t$ is selected, the generator 220 positively sets the label and generates negative labels for the non-selected pairs $(a_s, a'_t)$ where $a'_t \neq a_t$. Where the signal indicates no correct mapping attributes are included in the top-k suggestions, the generator 220 generates negative labels for all the pairs $(a_s, a_t)$ where $a_t \in k_s$.

In order for the customer device 234, or a user operating the customer device 234, to select the correct mapping, the customer device 234 must have some knowledge of the ISS 216. Accordingly, the processor 206 may implement a least confident anchor (LCA) model in order to reduce a number of labels needed to label the attributes. For example, the processor 206 may select a number N of attributes and asks the customer device 234 to provide the correct mapping. In some examples, N equals one so that only one attribute is selected at a time. The LCA model is a smart attribute selection strategy that identifies the set of N most informative attributes to be labeled. The LCA model may maintain a set of anchor attributes that contain the most informative attributes of the received customer schema. The anchor-set may be provided by the customer device 234 with the customer schema or the processor 206 may create a default anchor set based on the PK/FK relationships in the received customer schema. The PK/FK relationships include information indicating how various entities and attributes are connected with each other. The anchor set of the source schema may include the attributes in {e.pk,e.f ks|∀e∈Es}. For example, for the customer schema 301 illustrated in FIG. 3, the default anchor set is {Item.item_id, Order.order_id, Order.item_id}.

The processor 206 may use the LCA strategy to select N attributes from the anchor set. For example, the processor 206 chooses N unlabeled anchor attributes $a_s$ with the least prediction confidence $c_s$ among the set of anchor attributes. At a first iteration, the processor 206 selects the first N attribute(s) from the anchor set to output to the customer device 234 to label. Additional attributes may be output to the customer device 234 for labeling until all the attributes in the anchor set are labeled. Upon all attributes in the anchor set being labeled, the processor 206 may apply the least confidence strategy into other non-anchor attributes. Following the N attributes being selected, the customer device 234 is queried to provide corresponding mapping to the ISS 216. For each correct mapping ($a_s$, $a_t$) such as returned by the customer device 234, the generator 220 marks the label for ($a_s$, $a_t$) to be 1 and all other ($a_s$, $a'_t$) to be −1.

It should be understood that the N attributes may be selected at any point throughout the iterative process of labeling the attributes. In some examples, the processor 206 selects the N attributes using the LCA model prior to or after the first label has been generated. In other implementations, the processor 206 controls the ML model 230 to implement the LCA model before or after a first label has been generated. In some implementations, the label of each of the N attributes are not changed following the selection of the respective attribute. In other words, once an attribute is labeled, the attribute is removed from a pool of attributes to be used for feedback.

Figure 5:
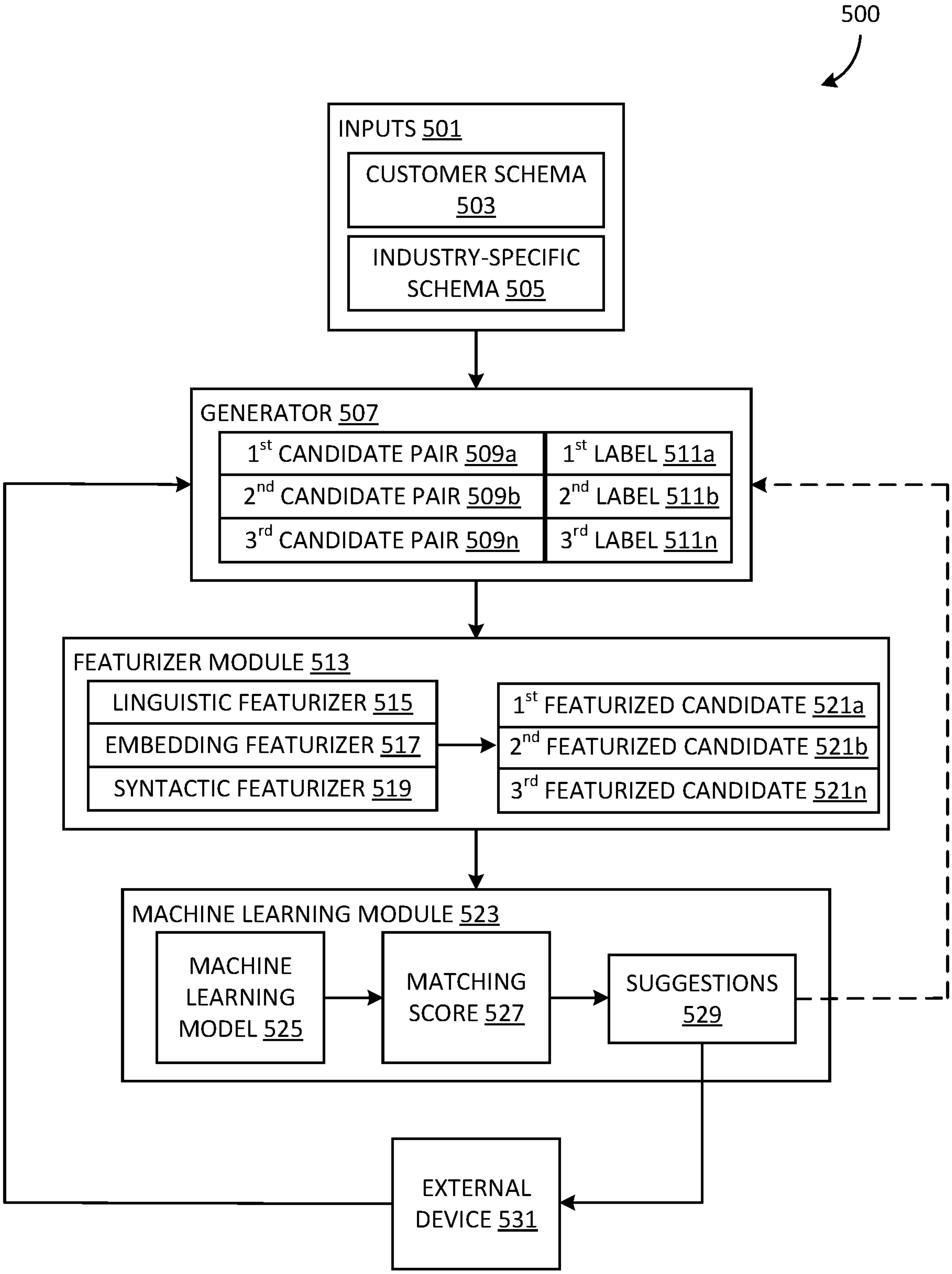
FIG. 5 is a system diagram illustrating a training procedure for a learned schema mapper according to various examples of the present disclosure.

FIG. 5 is a system diagram illustrating a training procedure for a learned schema mapper according to various examples of the present disclosure. The system 500 illustrated in FIG. 5 is presented for illustration only and should not be construed as limiting. Various elements may be added to, removed from, or rearranged from the system 500 without departing from the scope of the present disclosure.

The system 500 includes inputs 501. The inputs 501 include a customer schema 503 and an ISS 505. The customer schema 503 may be the customer schema 301 and the ISS may be the ISS 307 and/or the ISS 216. In some examples, the ISS 505 is one of a plurality of ISS 216 stored as data 214 in the data storage device 212 that is selected corresponding to the customer schema 503. For example, multiple ISSs 216 may be stored in the data storage device 212 and a particular ISS 505 is selected that corresponds to an industry of the customer schema 503. The ISS 505 is the schema which the customer schema 503 is to be mapped to.

In some implementations, each iteration through the system 500 includes three phases of featurizing candidate pairs, training a ML model and outputting the mapping suggestions, and incorporating feedback to update attribute labels and further improve the ML model. The system 500 includes a generator 507 that generates candidate pairs 509 and updates associated labels 511 based on received feedback at the end of each iteration, a featurizer module 513 that featurizes the candidate pairs 509, and a ML module 523 that is trained and outputs mapping suggestions.

The generator 507 may be the generator 220. The generator 507 generates a set of candidate pairs 509. For example, FIG. 5 illustrates a first candidate pair 509*a*, a second candidate pair 509*b*, and a third candidate pair 509*n*.

However, although FIG. 5 illustrates three candidate pairs 509, any number of candidate pairs 509 may be generated by the generator 507. As described herein, each candidate pair is the Cartesians product of the customer schema 503 and the ISS 505 and is calculated as $P=A_s\times A_t=\{(a_s,a_t)|as\in A_s, a_t\in A_t\}$. For example, the first candidate pair 509*a* may be ($a_{s1}$, $a_{t1}$), the second candidate pair 509*b* may be ($a_{s1}$, $a_{t2}$), and the third candidate pair 509*n* may be ($a_{s1}$, $a_{t3}$). In other words, the attribute $a_{s1}$ matches with each of the attributes $a_{t1}$, $a_{t2}$, and $a_{t3}$, resulting in three candidate pairs 509. Each potential match is a generated candidate pair 509, and an iteration through the system 500 determines which of $a_{t1}a_{t2}$, and $a_{t3}$ is the best match for $a_{s1}$.

Accordingly, each candidate pair 509 includes a first attribute and a second attribute. Collectively, the first attribute and the second attribute comprise a relational schema that defines respective attributes of one or more of the received customer schema or the industry-specific schema. In one example, the first attribute is a name and the second attribute is a description. Collectively, the first attribute and the second attribute comprise a sentence including the name and the description.

Each of the candidate pairs 509 includes an associated label 511. For example, the first candidate pair 509*a* includes a first label 511*a*, the second candidate pair 509*b* includes a second label 511*b*, and the third candidate pair 509*c* includes a third label 511*n*. Each label 511 may be the label $l_p$ as described herein. The label 511 may initially be equal to −1, indicating the respective candidate pair 509 is currently unlabeled. As the generator 507, the featurizer module 513, and the ML module 523 execute, as described in greater detail herein, the labels 511 may be updated to equal 1, indicating a correct mapping of the respective candidate pair 509, or equal to zero, indicating an incorrect mapping of the respective candidate pair. The particular attributes $a_s$, $a_t$ to be labeled may be prioritized, or selected, using the LCA model described herein. For example, the processor 206 may implement the LCA model to reduce a number of labels needed to label the attributes by selecting a number N of attributes to be prioritized for labeling.

The featurizer module 513 converts the candidate pairs 509 into a numerical vector, i.e., a featurized candidate 521, which may be used as inputs to the ML module 523. The featurizer module 513 may include one or more of a linguistic featurizer 515, an embedding featurizer 517, and the syntactic featurizer 519. In some examples, the featurizer module 513 may be the featurizer module 222, the linguistic featurizer 515 may be the linguistic featurizer 224, the embedding featurizer 517 may be the embedding featurizer 517 may be the embedding featurizer 226, and the syntactic featurizer 519 may be the syntactic featurizer 228.

The linguistic featurizer 515 takes the generated pairs 509 and determines linguistic similarity between the attributes $a_s$ and $a_t$ in the generated pair 509. As described herein, the linguistic featurizer 515 may be a BERT featurizer that determines the linguistic similarity between the attributes $a_s$ and $a_t$ in the generated pair 509 and predicts whether the attributes $a_s$ and $a_t$ represent a correct mapping by leveraging NLP tasks such as text generation, text classification, summary extraction, entity matching, and so forth to capture similarities between the attributes in each candidate pair using the corresponding names and descriptions. The embedding featurizer 517 calculates and outputs the embedded word similarity of the candidate pairs. For example, the embedding featurizer 517 calculates the cosine similarity between the embedding representations of the attribute name. by using a pre-trained word embedding as the synonym dictionary The syntactic featurizer 519 measures whether two attributes are syntactically similar and outputs the syntactic similarity of the generated candidate pairs. For example, for an attribute pair ($a_s$, $a_t$), the similarity score may be calculated as $$\frac{lsc\,(\text{as.name.at.name})}{\min(\text{len(as.name), len(at, name)})},$$

where lcs computes the length of the longest common sub-string. By combining multiple types of featurizers 515-519 within the featurizer module 513, the featurizer module 513 provides improved accuracy, particularly in scenarios where the customer schema uses different naming conventions that the ISS 505 and a limited number of labels, or no labels, are initially provided.

In some implementations, the linguistic featurizer 515 is updated at each iteration throughout the system 500. For example, after input is received from an external device 531, described in greater detail below, the linguistic featurizer 515 may be updated as a new candidate pair 509 is input to the featurizer module 513. In some examples, updating the linguistic featurizer 515 includes freezing the weights in the linguistic featurizer 515 and either retraining the final fine-tuning model based on the labeled matching pairs or incrementally training the model based on the newly provided candidate pairs 509. In some examples, the embedding featurizer 517 and the syntactic featurizer 519 are constant and are not updated.

Using each of the linguistic featurizer 515, the embedding featurizer 517, and the syntactic featurizer 519, the featurizer module 513 generates the featurized candidates 521. The featurized candidates 521 may be the numerical vector corresponding to each candidate pair 509. The featurized candidates 521 measure the collective similarities of the candidate pairs 509 based on the linguistic, embedded, and syntactic similarities as determined by the linguistic featurizer 515, the embedding featurizer 517, and the syntactic featurizer 519, respectively. For example, the first candidate pair 509*a* ($a_{s1}$, $a_{t1}$) may produce a first featurized candidate 521*a* of (0.1, 0.3, 0.2), the second candidate pair 509*b* ($a_{s1}$, $a_{t2}$) may produce a second featurized candidate 521*b* of (0.3, 0.4, 0.9), and the third candidate pair 509*c* ($a_{s1}$, $a_{t3}$) may produce a third featurized candidate 521*n* of (0.8, 0.2, 0.7).

The generated featurized candidates 521 are used as inputs provided to the ML module 523. The ML module 523 includes a ML model 525 that may be the ML model 230. The ML model 525 may be a regression linear model that, in each iteration, is trained on the partially labeled data by self-training, a form of semi-supervised learning, using the output(s) of the featurizer module 513 as inputs and updated labels 511, after the first iteration, as the target.

The ML model 525 generates one or more matching scores 527 based on the featurized candidates 521. The one or more matching scores 527 measure a probability that the attributes in each generated pair 509 match. For example, as described herein, the candidate pairs 509 match $a_{t1}$, $a_{t2}$, and $a_{t3}$ to $a_{s1}$ to determine which of $a_{t1}$, $a_{t2}$, and $a_{t3}$ is the best match. The matching scores 527 measure and quantify how closely each of $a_{t1}$, $a_{t2}$, and $a_{t3}$ matches $a_{s1}$. In some examples, the matching scores 527 are a measure between zero to one, where scores closer to zero represent a lesser match and scores closer to one represent a higher match. In other words, a score of 1.0 indicates the best match, while a score of 0.0 represents the worst match. For example, the matching scores 527 may be 0.2 for $a_{t1}$, 0.1 for $a_{t2}$, 0.9 for $a_{t3}$.

Based on the matching scores 527, the ML module 523 identifies one or more suggestions, or suggested labels, 529. The one or more suggestions 529 may be one or more labels, each label corresponding to one of the second attributes included in the matching scores 527. In some implementations, the matching scores 527 may be sorted, such as by highest to lowest, to indicate which of $a_{t1}$, $a_{t2}$, and $a_{t3}$ most closely matches $a_{s1}$. The corresponding suggestions 529 are the labels associated with each of $a_{t3}$, $a_{t1}$, $a_{t2}$. More particularly, $a_s$ may represent a name and $a_t$ may represent a description as described herein. Each respective label may be the particular description associated with the respective $a_{t1}$, $a_{t2}$, $a_{t3}$, and so forth. For example, the suggestions 529 may be generated as $a_{s1}$: [$a_{t3}$, $a_{t1}$, $a_{t2}$] in the example above where the matching scores 527 are 0.2 for $a_{t1}$, 0.1 for $a_{t2}$, and 0.9 for $a_{t3}$, because $a_{t3}$ presented the highest matching score 527, $a_{t2}$ presented the lowest matching score 527, and $a_{t1}$ presented a matching score 527 in between those of $a_{t2}$ and $a_{t3}$.

In the example presented in FIG. 5, three candidate pairs 509 were generated, three featurized candidates 521 were generated, three matching scores 527 were generated, and three suggestions 529 were generated. However, various implementations are possible. The suggestions 529 may be generated as one suggestion 529 or more than three suggestions 529. For example, only the candidate pair 509 that presents the highest matching score 527 may be generated as a suggestion 529. In another example, all candidate pairs 509 that presented a matching score 527 above a particular threshold, indicating a probability of a match that is sufficiently high, is generated as a suggestion 529. In still another example, a predetermined number of suggestions 529 are generated, such as the candidate pairs 509 presenting the two, three, five, and so forth highest matching scores 527.

In some implementations, the suggestion or suggestions 529 are output to an external device 531, such as the customer device 234. The generator 507 may then receive a signal from the external device 531 selecting the matching score 527 or one of the matching scores 527, depending on the suggestion or suggestions 529, to be used as the label for the particular candidate pair 509. In the example presented herein, where $a_{t3}$ is the highest matching score 527, the external device 531 may select the label of $a_{t3}$ as the appropriate label for $a_{s1}$. In other implementations, a single suggestion 529 is output to the generator 507, which updates the label to equal one, indicating a correct mapping, and labels the attribute accordingly. Thus, the system 500 may be able to perform without additional input from a user or customer device 234, exclusive of the original transmission of the customer schema 503.

Based on the selection, the generator 507 updates the label 511 for ($a_{s1}$, $a_{t3}$) to equal to one, indicating a correct mapping. The generator 507 then outputs a new set of generated pairs 509 to the featurizer module 513 as a next iteration through the system 500 begins. Iterations through the system 500 continue as described herein until all the attributes are updated to labeled or until a predetermined number of iterations through the system 500 have been completed. For example, the generator 507 may continue iterating until each label 511 is equal to one, indicating a correct mapping. For example, while any of the first label 511*a*, the second label 511*b*, and the third label 511*n* are either unlabeled and equal to −1 or incorrectly mapped and labeled equal to zero, the generator 507 initiates another iteration. As described herein, it should be understood that more or fewer than three candidate pairs 509, and associated labels 511, may be included.

Test results that implement the system 500 show significantly improved capturing of patterns in the customer schema 503, resulting in only a small number of additional mapping labels to be generated. For example, the system 500 may require less than thirty percent of total customer schema attributes to be manually labeled in order to map the full customer schema 503 to the ISS 505, as opposed to seventy-five percent with the best baseline from current solutions. Further, with less than five percent of manual labels provided, the system 500 may correctly map approximately fifty percent of the customer schema 503 attributes. The baseline approaches are similar to that of manual labeling only after ten percent of labels are provided. In other words, providing more labels does not help current solutions generalize to a larger number of attributes. However, the inclusion of the linguistic featurizer 515 is shown to improve the prediction accuracy by up to forty percent. This improvement is noticeable both when the number of provided mapping labels is small and when the number of provided mapping labels is larger. Pretraining the linguistic featurizer 515 using the ISS 505 helps the linguistic featurizer 515 to capture the semantics of the customer schema 503 even when limited labels are provided and when the customer schema 503 that uses different naming conventions.

Test results that implement the system 500 further show significant improvement over current solutions when noise is introduced, such as where erroneous labels have been provided when mapping the source attributes to the ISS 505. For example, during human labeling, noise may be generated when the user selects an attribute from the ISS 505 that is semantically close to the source attribute but is actually not the correct mapping target. To simulate this noise generation process in testing, noise may be introduced by corrupt the ground truth mapping pair $(a_s, a_t)$ to $(a_s, a'_t)$ by selecting a corruption attribute $a'_t$ from the ISS 505 $(a'_t \neq a_t)$ with a probability, i.e., noise rate, $n<1$. In testing, even with the presence of the noise, the system 500 shows improvement over the best baseline.

In some implementations, the ISS 505 may be partitioned prior to any iterations of the system 500 being executed. For example, where the customer device 234 or a user operating the customer device 234 has knowledge of the ISS 505, a subset of entities relevant to the customer schema 503 may be identified and preselected prior to any iterations of the system 500 executing.

Figure 6:
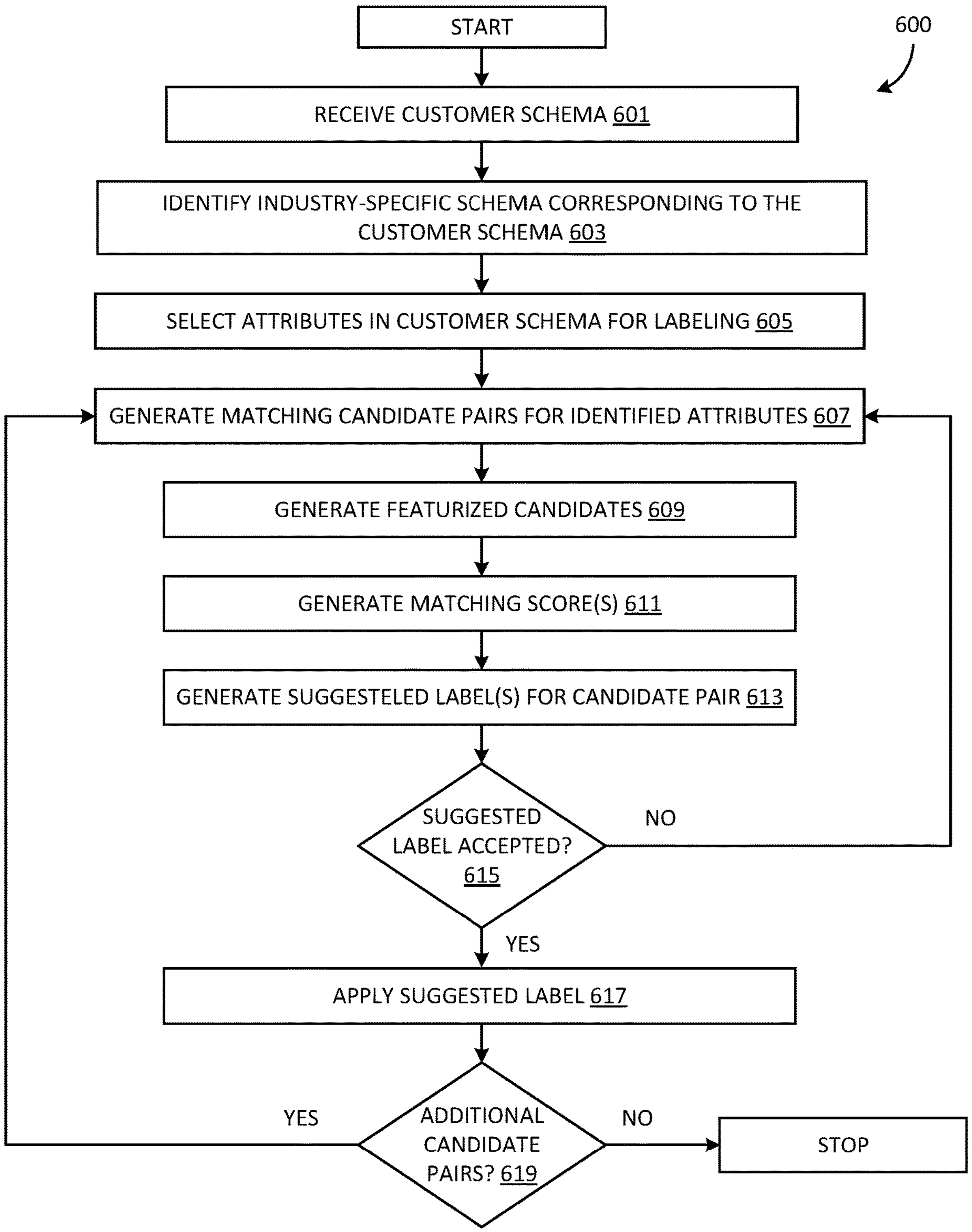
FIG. 6 is a flow chart illustrating a computer-implemented method of linguistic schema mapping according to various examples of the present disclosure.

FIG. 6 is a flow chart illustrating a computer-implemented method of linguistic schema mapping according to various examples of the present disclosure. The operations illustrated in FIG. 6 are for illustration and should not be construed as limiting. Various examples of the operations can be used without departing from the scope of the present disclosure. The operations of the flow chart 600 can be executed by one or more components of the system 200, including the processor 206, the communications interface 208, the generator 220, the featurizer module 222, and the ML model 230.

The flow chart 600 begins by receiving a customer schema in operation 601. The customer schema may be the customer schema 301 and/or the customer schema 503. The customer schema may be received by the input receiving module 218.

In operation 603, the processor 206 identifies an industry-specific schema (ISS) that corresponds to the received customer schema. The ISS may be the ISS 216, the ISS 307, and/or the ISS 505. In some implementations, each of the ISS 216 stored in the data storage device 212 may be scanned for one or more similar attributes to one or more attributes included in the received customer schema, and the ISS 216 that appears to be most closely aligned to received customer schema is identified for use throughout the flow chart 600.

In operation 605, the processor 206 selects one or more attributes in the received customer schema to prioritize for labeling. In some implementations, the processor 206 applies the least confidence anchor (LCA) strategy to select the one or more attributes to prioritize for labeling. For example, the processor 206 may identify one or more attributes for which the confidence is particularly low and/or the attribute is particularly important and thus requires labeling, and therefore labeling is prioritized for the selected one or more attributes.

In operation 607, the generator 220 generates matching candidate pairs for the selected attributes. The candidate pairs may be the candidate pairs 509 as described herein. As described herein, each candidate pair is the Cartesians product of the customer schema 503 and the ISS 505 and is calculated as $P=A_s \times A_t=\{(a_s,a_t)|as \in A_s,a_t \in A_t\}$. For example, the first candidate pair 509*a* may be $(a_{s1}, a_{t1})$, the second candidate pair 509*b* may be $(a_{s1}, a_{t2})$, and the third candidate pair 509*n* may be $(a_{s1}, a_{t3})$. In other words, the attribute $a_{s1}$ matches with each of the attributes $a_{t1}$, $a_{t2}$, and $a_{t3}$.

In operation 609, the featurizer module 222 generates featurized candidates 521. The featurized candidates 521 may be a numerical vector corresponding to a candidate pair 509. The featurizer module 222 may generate a plurality of featurized candidates 521, each featurized candidate 521 corresponding to a separate candidate pair 509. The featurized candidates 521 may be generated based on one or more of linguistic similarities between the attributes of the candidate pair 509 determined by the linguistic featurizer 224, embedded similarities between the attributes of the candidate pair 509 determined by the embedded featurizer 226, and syntactic similarities between the attributes of the candidate pair 509 determined by the syntactic featurizer 228. In other words, a featurized candidate 521 measures the collective similarities of the candidate pairs 509 based on the linguistic, embedded, and syntactic similarities as determined by the linguistic featurizer 515, the embedding featurizer 517, and the syntactic featurizer 519, respectively.

In operation 611, the ML model 230 generates one or more matching scores 527 based on the generated featurized candidates 521. The generated featurized candidates 521 are used as inputs provided to the ML model 230. The one or more matching scores 527 measure a probability that the attributes in each generated pair 509 match. For example, as described herein, the candidate pairs 509 match $a_{t1}$, $a_{t2}$, and $a_{t3}$ to $a_{s1}$ to determine which is the best match. The matching scores 527 measure and quantify how closely each of $a_{t1}$, $a_{t2}$, and $a_{t3}$ matches $a_{s1}$. A relatively higher matching score 527 indicates a greater likelihood that the second attribute $a_t$ is an accurate label for the first attribute $a_s$, while a relatively lower matching score 527 indicates a lesser likelihood that the second attribute $a_t$ is an accurate label for the first attribute $a_s$.

In operation 613, the ML model 230 generates one or more suggested labels, or suggestions, 529 for the first attribute $a_s$. For example, the ML model 230 may identify a predetermined quantity of the matching scores 527 that have the highest value or values of the generated matching scores 527, identify the respective labels corresponding to each of the matching scores 527 identified as having the highest values, and generate the one or more suggested labels 529 corresponding to one or more of the second attributes included in the matching scores 527 having the highest values. In some examples, the generated one or more suggested labels 529 includes a predetermined quantity k of labels that included the highest scores. For example, the one or more suggested labels 529 may be a selection of the two, three, five, and so forth labels corresponding to the matching scores 527 having the highest values. In another example, the one or more suggested labels 529 may be a label corresponding to the single highest matching score 527. In yet another example, the one or more suggested labels 529 may include labels corresponding to each matching score 527 above a certain threshold, such as each matching score 527 that could reasonably be the accurate label for the first attribute $a_s$. In some implementations, the generated one or more suggested labels 529 are output to an external device, such as the customer device 234, by the suggestion outputting module 232.

In operation 615, the processor 206 determines whether one of the one or more suggested labels was accepted. Where one of the one or more suggested labels was accepted, the processor 206 proceeds to operation 617 and applies the accepted suggested label. For example, the input receiving module 218 may receive a selection of one of the one or more suggested labels 529 from the customer device 234. In other words, one of the one or more suggested labels 529 may be accepted by the customer device 234. In other implementations, a label of the one or more suggested labels 529 having the highest matching score 527 is automatically selected and applied as a label 511. Where none of the one or more suggested labels were accepted, the processor 206 returns to operation 607 and generates additional candidate pairs 509 for the identified attribute.

In operation 619, the processor 206 determines whether additional candidate pairs 509 are prepared for labeling. In some implementations, the processor 206 determines whether the label of any of the candidate pairs 509 remains equal to −1, indicating the candidate pair 509 is unlabeled. Where the label of at least one of the candidate pairs 509 is equal to −1, indicating the particular candidate pair 509 is unlabeled, the processor 206 returns to operation 607 and determines the matching candidate pair 509 to be labeled. In implementations where the processor 206 determines no additional pairs are labeled, the flow chart 600 terminates.

Additional Examples

Some examples herein are directed to a method of performing linguistic schema mapping via semi-supervised learning, as illustrated by the flow chart 600. The method (600) includes receiving (601) a customer schema (503), identifying (603) an industry-specific schema (505) corresponding to the received customer schema, selecting (605) a first attribute (305) included within the received customer schema for labeling, generating (607) at least one candidate pair (509) based on the selected one or more attributes, the candidate pair including the first attribute and a second attribute (311); generating (609) at least one featurized candidate (521) based on an identified linguistic similarity, determined by a linguistic featurizer (515), between the first attribute and the second attribute; generating (613) one or more suggested labels (529) for the first attribute, the one or more suggested labels corresponding to the second attribute, and applying (617) a label of the one or more suggested labels to the first attribute.

In some examples, at least one processor applies a least confidence anchor strategy to select the first attribute, wherein the least confidence anchor strategy identifies one or more attributes for which the ML model is least confident in a proposed label.

In some examples, the linguistic featurizer is a pretrained bidirectional encoder representations from transformers (BERT) model.

In some examples, the second attribute includes a plurality of second attributes, and generating the one or more suggested labels includes generating a matching score (527) for each second attribute of the plurality of second attributes, each matching score measuring how closely the respective second attribute matches the first attribute.

In some examples, generating the one or more suggested labels includes identify the matching score that has a highest value of the generated matching scores, and identifying the second label as associated with the matching score having the highest value.

In some examples, generating the one or more suggested labels includes identifying a predetermined quantity of matching scores having highest value of the generated matching scores, and identifying the respective second labels associated with the predetermined quantity of matching scores having the highest value of the generated matching scores.

In some examples, the label of the one or more suggested labels is automatically applied to the first attribute based at least in part on the suggested label being generated.

In some examples, the label of the one or more suggested labels is applied to the first attribute based at least in part on receiving a signal from an external device.

In some examples, the linguistic featurizer is included in a featurizer module, the featurizer module further includes one or more of an embedding featurizer and a syntactic featurizer, and the featurizer module is configured to generate the at least one featurized candidate based on at least one of an identified embedding similarity and an identified syntactic similarity, identified by the embedding featurizer and the syntactic featurizer, respectively, between the first attribute and the second attribute.

In some examples, the at least one customer schema is configured to identify the industry-specific schema based at least in part on the first attribute included in the received customer schema.

In some examples, a relational schema includes each of the first attribute and the second attribute, and the relational schema defines respective attributes of one or more of the received customer schema or the industry-specific schema.

Although described in connection with an example computing device 100, system 200, and system 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system, comprising:

a processor;

a memory storing instructions that are executable by the processor, the instructions upon execution by the processor cause the processor to:

receive a customer schema;

identify an industry-specific schema corresponding to the received customer schema;

select a first attribute included within the received customer schema for labeling;

generate a candidate pair based on the selected first attribute, the candidate pair including the first attribute and a second attribute;

generate, using a linguistic featurizer, an embedding featurizer, and a syntactic featurizer for the candidate pair, a featurized candidate based on an identified similarity between the first attribute and the second attribute, the featurized candidate being a 3-tuple numerical vector corresponding to the candidate pair based on the identified similarity including a linguistic similarity, an embedded similarity, and a syntactic similarity between the first attribute and the second attribute in the candidate pair, wherein the linguistic similarity, the embedded similarity, and the syntactic similarity in the 3-tuple numerical vector are identified using the linguistic featurizer, the embedding featurizer, and the syntactic featurizer respectively;

generate, using a semi-supervised machine learning (ML) model, a suggested label for the first attribute based on the featurized candidate, the suggested label corresponding to the second attribute, wherein the semi-supervised ML model is trained on labeled training data including the featurized candidate and used to generate pseudo-labels for unlabeled data points, and wherein the semi-supervised ML model is iteratively retrained based on received feedback on the generated pseudo-labels in a train-predict loop until all candidate pairs are labeled or a maximum number of iterations is reached; and apply the suggested label to the first attribute, wherein applying the suggested label comprises updating the linguistic featurizer, based on the applied suggested label, including adding a sentence representation of the candidate pair and the applied suggested label with a larger sample weight than samples generated using only the industry-specific schema.

2. The system of claim 1, wherein the instructions upon execution by the processor further cause the processor to apply a least confidence anchor strategy to select the first attribute, wherein the least confidence anchor strategy identifies the first attribute that represents a most informative attribute of the received customer schema.

3. The system of claim 1, wherein the linguistic featurizer is trained one time per industry-specific schema.

4. The system of claim 1, wherein:

the second attribute includes a plurality of second attributes, and wherein the instructions upon execution by the processor further cause the processor to:

generate a matching score for each second attribute of the plurality of second attributes, each matching score measuring how closely the respective second attribute matches the first attribute.

5. The system of claim 4, wherein the instructions upon execution by the processor further cause the processor to:

identify, using the ML model, the matching score that has a highest value of the generated matching scores; and identify, using the ML model, the suggested label as associated with the matching score having the highest value.

6. The system of claim 4, wherein the instructions upon execution by the processor further cause the processor to:

identify, using the ML model, a predetermined quantity of matching scores having a highest value of the generated matching scores; and identify, using the ML model, respective labels associated with the predetermined quantity of matching scores having the highest value of the generated matching scores.

7. The system of claim 1, wherein the instructions upon execution by the processor further cause the processor to:

automatically apply the suggested label to the first attribute based at least in part on the suggested label being generated.

8. The system of claim 1, wherein the instructions upon execution by the processor further cause the processor to:

apply the suggested label to the first attribute based at least in part on receiving a signal from an external device.

9. The system of claim 1, wherein a featurizer module comprising the linguistic featurizer, the embedding featurizer, and the syntactic featurizer converts the candidate pair into the 3-tuple numerical vector.

10. The system of claim 1, wherein:

the instructions upon execution by the processor cause the processor to identify the industry-specific schema based at least in part on the first attribute included in the received customer schema.

11. The system of claim 1, wherein:

a relational schema includes each of the first attribute and the second attribute, and the relational schema defines respective attributes of one or more of the received customer schema or the industry-specific schema.

12. A method, comprising:

receiving, by an input receiving module, a customer schema;

identifying, by a processor, an industry-specific schema corresponding to the received customer schema;

selecting, by the processor, a first attribute included within the received customer schema for labeling;

generating, by the processor, a candidate pair based on the selected first attribute, the candidate pair including the first attribute and a second attribute;

generating, by processor using a linguistic featurizer, an embedding featurizer, and a syntactic featurizer for the candidate pair, a featurized candidate based on an identified similarity between the first attribute and the second attribute, the featurized candidate being a 3-tuple numerical vector corresponding to the candidate pair based on the identified similarity including a linguistic similarity, an embedded similarity, and a syntactic similarity between the first attribute and the second attribute in the candidate pair, wherein the linguistic similarity, the embedded similarity, and the syntactic similarity in the 3-tuple numerical vector are identified using the linguistic featurizer, the embedding featurizer, and the syntactic featurizer respectively;

generating, by processor using a semi-supervised machine learning (ML) model, a matching score for the candidate pair based on the featurized candidate, the matching score measuring how closely the second attribute matches the first attribute in the candidate pair;

identifying, by the processor using the semi-supervised ML model, a predetermined quantity of matching scores having a highest value of the generated matching scores;

identifying, by the processor using the semi-supervised ML model, the candidate pair with the predetermined quantity of matching scores having the highest value of the generated matching scores;

generating, by the processor using the ML model, a suggested label for the first attribute in the candidate pair, the suggested label corresponding to the second attribute in the candidate pair, wherein the semi-supervised ML model is trained on labeled training data including the featurized candidate and used to generate pseudo-labels for unlabeled data points, and wherein the semi-supervised ML model is iteratively retrained based on received feedback on the generated pseudo-labels in a train-predict loop until all candidate pairs are labeled or a maximum number of iterations is reached; and applying, by the processor, the suggested label to the first attribute, wherein applying the suggested label comprises updating the linguistic featurizer, based on the applied suggested label, including adding a sentence representation of the candidate pair and the applied suggested label with a larger sample weight than samples generated using only the industry-specific schema.

13. The method of claim 12, further comprising applying, by the processor, a least confidence anchor strategy to select the first attribute, wherein the least confidence anchor strategy identifies the first attribute that represent a most informative attribute of the received customer schema.

14. The method of claim 12, wherein the linguistic featurizer is a pretrained bidirectional encoder representations from transformers (BERT) model.

15. The method of claim 12, wherein applying the suggested label further comprises automatically applying the suggested label to the first attribute based at least in part on the suggested label being generated.

16. The method of claim 12, wherein applying the suggested label further comprises applying the suggested label to the first attribute based at least in part on receiving a signal from an external device.

17. The method of claim 12, wherein a featurizer module comprising the linguistic featurizer, the embedding featurizer, and the syntactic featurizer converts the candidate pair into the 3-tuple numerical vector.

18. The method of claim 12, wherein identifying the industry-specific schema further includes:

identifying the first attribute included in the received customer schema; and associating the first attribute included in the received customer schema with at least one attribute in the identified industry-specific schema.

19. A computer-storage memory device embodied with executable instructions that, when executed by a processor, cause the processor to:

receive a customer schema;

identify an industry-specific schema corresponding to the received customer schema;

select a first attribute included within the received customer schema for labeling;

generate a candidate pair based on the selected first attribute, the candidate pair including the first attribute and a second attribute;

generate a featurized candidate based on an identified similarity between the first attribute and the second attribute, the featurized candidate being a 3-tuple numerical vector corresponding to the candidate pair based on the identified similarity including a linguistic similarity, an embedded similarity, and a syntactic similarity between the first attribute and the second attribute in the candidate pair, wherein the linguistic similarity, the embedded similarity, and the syntactic similarity in the 3-tuple numerical vector are identified using a linguistic featurizer, an embedding featurizer, and a syntactic featurizer respectively;

generate, using a semi-supervised machine learning (ML) model, a matching score for the candidate pair based on the featurized candidate, the matching score measuring how closely the second attribute matches the first attribute in the candidate pair;

identify, using the semi-supervised ML model, a predetermined quantity of matching scores having a highest value of the generated matching scores;

identify, using the semi-supervised ML model, the candidate pair with the predetermined quantity of matching scores having the highest value of the generated matching scores;

generate, using the semi-supervised ML model, a suggested label for the first attribute in the candidate pair, the suggested label corresponding to the second attribute in the candidate pair having the matching score with the highest value, wherein the semi-supervised ML model is trained on labeled training data including the featurized candidate and used to generate pseudo-labels for unlabeled data points, and wherein the semi-supervised ML model is iteratively retrained based on received feedback on the generated pseudo-labels in a train-predict loop until all candidate pairs are labeled or a maximum number of iterations is reached; and apply the suggested label to the first attribute, wherein applying the suggested label comprises updating the linguistic featurizer, based on the applied suggested label, including adding a sentence representation of the candidate pair and the applied suggested label with a larger sample weight than samples generated using only the industry-specific schema.

20. The computer storage memory device of claim 19, further comprising instructions that, when executed by the processor, cause the processor to apply a least confidence anchor strategy to select the first attribute, wherein the least confidence anchor strategy identifies one or more attributes for which the ML model is least confident in a proposed label.

* * * * *